United States Patent
Saitou et al.

(10) Patent No.: US 8,135,871 B2
(45) Date of Patent: Mar. 13, 2012

(54) COMPUTER SYSTEM AND CONTROL METHOD OF THE SAME

(75) Inventors: Shinya Saitou, Kanagawa (JP); Masashi Tominaga, Kanagawa (JP); Tomohiko Ohtsu, Kanagawa (JP)

(73) Assignee: Renesas Electronics Corporation, Kanagawa (JP)

( * ) Notice: Subject to any disclaimer, the term of this patent is extended or adjusted under 35 U.S.C. 154(b) by 161 days.

(21) Appl. No.: 11/359,563

(22) Filed: Feb. 23, 2006

(65) Prior Publication Data

US 2006/0190666 A1    Aug. 24, 2006

(30) Foreign Application Priority Data

Feb. 24, 2005    (JP) ................................. 2005-049559

(51) Int. Cl.
*G06F 13/00* (2006.01)
*G06F 13/20* (2006.01)

(52) U.S. Cl. .......................................... 710/6; 710/313

(58) Field of Classification Search ....... 710/6; 709/253
See application file for complete search history.

(56) References Cited

U.S. PATENT DOCUMENTS

| | | | | |
|---|---|---|---|---|
| 6,018,779 A * | 1/2000 | Blumenau | ...................... | 710/68 |
| 6,601,119 B1 * | 7/2003 | Slutz et al. | ..................... | 710/104 |
| 6,901,465 B2 | 5/2005 | Kamihara et al. | | |
| 6,925,519 B2 * | 8/2005 | Day et al. | ..................... | 710/315 |
| 7,010,638 B2 * | 3/2006 | Deng et al. | .................... | 710/306 |
| 7,149,840 B1 * | 12/2006 | Kolokowsky | ................. | 710/313 |
| 7,159,065 B1 * | 1/2007 | Marlatt | ......................... | 710/313 |
| 2002/0169905 A1 * | 11/2002 | Ishida et al. | .................. | 710/100 |
| 2003/0142683 A1 | 7/2003 | Lam et al. | | |
| 2004/0136224 A1 | 7/2004 | Hamer et al. | | |
| 2005/0015611 A1 | 1/2005 | Poisner | | |
| 2005/0149656 A1 * | 7/2005 | Seto | ............................. | 710/105 |
| 2005/0160196 A1 * | 7/2005 | Dutton et al. | ................... | 710/10 |
| 2005/0289260 A1 * | 12/2005 | Hamer et al. | ................... | 710/74 |
| 2006/0251087 A1 * | 11/2006 | Ng et al. | ...................... | 370/401 |

FOREIGN PATENT DOCUMENTS

| | | |
|---|---|---|
| JP | 5-265911 A | 10/1993 |
| JP | 2001-344192 | 12/2001 |
| JP | 2002-342261 A | 11/2002 |
| JP | 2004-164362 | 6/2004 |
| JP | 2005-538455 A | 12/2005 |
| TW | 501000 | 9/2002 |
| TW | 514791 | 12/2002 |
| TW | 200506627 A | 2/2005 |

\* cited by examiner

*Primary Examiner* — Henry Tsai
*Assistant Examiner* — Titus Wong
(74) *Attorney, Agent, or Firm* — Foley & Lardner LLP

(57) ABSTRACT

A computer system includes an information processing apparatus configured to incorporate a SCSI (Small Computer System Interface) command into a CBW (Command Block Wrapper), and transmits the CBW based on USB (Universal Serial Bus) protocol; and a peripheral apparatus configured to receive the CBW transmitted from the information processing apparatus, and transmit a value of a predetermined register indicating a state of a GPIO (general purpose input/output) interface to the information processing apparatus, when the SCSI command is a predetermined SCSI command. The information processing apparatus may issue the SCSI command based on an application program. The peripheral apparatus carries out a process corresponding to the SCSI command when the SCSI command is not the predetermined SCSI command.

37 Claims, 9 Drawing Sheets

Fig. 7

| Byte/bit | 7 | 6 | 5 | 4 | 3 | 2 | 1 | 0 |
|---|---|---|---|---|---|---|---|---|
| 0-3 | CSW Signature=53425355H(Little endian) | | | | | | | |
| 4-7 | CSW Tag | | | | | | | |
| 8-11 | CSW Data Residue | | | | | | | |
| 12 | CSW Status | | | | | | | |

COMPUTER SYSTEM AND CONTROL METHOD OF THE SAME

BACKGROUND OF THE INVENTION

1. Field of the Invention

The present invention relates to a computer system having an information processing apparatus and a peripheral device, a control method for the same.

2. Description of the Related Art

Conventionally, when a backup of data is carried out from a personal computer to an external peripheral device through a USB (Universal Serial Bus) interface, the personal computer uses an interruption transfer of a USB protocol and reads a value of a general purpose input/output (GPIO) terminal of the external peripheral device in a constant interval through a periodical polling by the personal computer.

However, when the personal computer is changed or when an operating system is changed, a device driver for the peripheral device must be again installed. This work is troublesome for an end user since he cannot quickly carry out the backup. Also, at a time of a development, not only an application program but also the device driver is required to be developed.

In Japanese Laid Open Patent Application (JP-P2004-164362A) as a first conventional example is disclosed a backup device which is connected through a bus interface to a portable storage device and has a built-in storage device different from the portable storage device. This backup device includes a first backup controller and a second backup controller. The first backup controller receives an external backup setting request and prepares a backup folder and then records the backup folder in the portable storage device. When the backup folder is prepared, the second backup controller prepares an identification file containing unique identification numbers to specify the storage device as a backup source and the portable storage device as a backup destination, and records the identification file in the storage device of the backup source and the portable storage device of the backup destination.

Also, a method of transmitting/receiving a vendor specific data is disclosed in Japanese Laid Open Patent Application (JP-P2001-344192A) as a second conventional example, in which a general command of a mass storage class is sent to a device to be connected by using a standard interface driver so as to instruct to execute an operation corresponding to the command through USB. In this conventional method, a transmitting side apparatus incorporates vendor specific data into at least one of an interface (I/F) general data and a class peculiar data in accordance with a predetermined rule, and transmits a combination data containing the vendor specific data, as an I/F general data or class peculiar data, to a receiving side apparatus. The receiving side apparatus receives the combination data containing the vendor specific data, separates and extracts the vendor specific data from the received combination data. Consequently, the vendor specific data is transferred.

SUMMARY OF THE INVENTION

In an aspect of the present invention, a computer system includes an information processing apparatus configured to incorporate a SCSI (Small Computer System Interface) command into a CBW (Command Block Wrapper), and transmits the CBW based on USB (Universal Serial Bus) protocol; and a peripheral apparatus configured to receive the CBW transmitted from the information processing apparatus, and transmit a value of a predetermined register indicating a state of a GPIO (general purpose input/output) interface to the information processing apparatus, when the SCSI command is a predetermined SCSI command.

Here, the information processing apparatus may issue the SCSI command based on an application program. The peripheral apparatus carries out a process corresponding to the SCSI command when the SCSI command is not the predetermined SCSI command.

In this case, the information processing apparatus may include a processing section configured to execute the application program to issue the predetermined SCSI command, and execute a device driver to incorporate the predetermined SCSI command into the CBW; and a USB interface configured to transmit the CBW to the peripheral apparatus based on the USB protocol and receive the register value. The processing section may execute the application program to carry out a process corresponding to the predetermined value when the register value is the predetermined value. In this case, the predetermined SCSI command may include a data specifying the predetermined register.

Also, the peripheral apparatus may includes a USB interface configured to receive the CBW transmitted from the information processing apparatus; and a processing section configured to execute a SCSI processing program to determine whether or not the SCSI command contained in the received CBW is the predetermined SCSI command. The processing section may read and transmit the register value to the USB interface when the SCSI command contained in the received CBW is the predetermined SCSI command, and the USB interface may transmit the register value to the information processing apparatus.

In this case, the processing section of the peripheral apparatus may carry out processing corresponding to the SCSI command contained in the received CBW when the SCSI command contained in the received CBW is not the predetermined SCSI command.

Also, the computer system may further include an input device configured to set a predetermined value as the register value in the register.

Here, the information processing apparatus may transmit a data to the peripheral apparatus when the register value is a predetermined value, and the peripheral apparatus may back up the data.

Also, the information processing apparatus may carry out a process of electrically disconnecting the peripheral apparatus from the information processing apparatus when the register value is a predetermined value.

Also, the information processing apparatus issues the SCSI command after a predetermined time when the register value is not the predetermined value.

In another aspect of the present invention, a peripheral apparatus includes a GPIO (general purpose input and output) interface; a register configured to store a value indicating a state of the GPIO interface; a USB (Universal Serial Bus) interface configured to receive a CBW (Command Block Wrapper) transmitted from an apparatus; and a processing section configured to execute a SCSI (Small Computer System Interface) processing program to determine whether or not a SCSI command contained in the received CBW is a predetermined SCSI command. The processing section reads the register value from the register to transmit the register value to the USB interface when the SCSI command contained in the received CBW is the predetermined SCSI command, and the USB interface transmits the register value to the apparatus.

Here, the processing section may carry out processing corresponding to the SCSI command contained in the received CBW when the SCSI command contained in the received CBW is not the predetermined SCSI command.

Also, the peripheral apparatus may further include an input device configured to set a predetermined value as the register value in the register.

Also, the peripheral apparatus may further include a storage section configured to store a data. The peripheral apparatus may back up the data transmitted from the apparatus and received by the USB interface in the storage section when the register value is a predetermined value.

Also, the peripheral apparatus may further include another interface connected to an external storage apparatus. The processing section may transmit a data received from the apparatus by the USB interface to the external storage apparatus through the another interface, such that the data is backed up, when the register value is a predetermined value.

Also, the peripheral apparatus may be set to an electrical disconnection possible state by the apparatus, when the register value is a predetermined value.

In another aspect of the present invention, a control method of a computer system, is achieved by issuing a SCSI (Small Computer System Interface) command in an information processing apparatus based on an application program; by incorporating the SCSI command into a CBW (Command Block Wrapper) in the information processing apparatus based on a device driver; by transmitting the CBW from the information processing apparatus to a peripheral apparatus based on USB (Universal Serial Bus) protocol; by receiving the CBW by the peripheral apparatus; by determining whether or not the SCSI command contained in the CBW is a predetermined SCSI command; by transmitting a value of a predetermined register indicating a state of a GPIO (general purpose input/output) interface from the peripheral apparatus to the information processing apparatus, when the SCSI command is the predetermined SCSI command; and by carrying out a process corresponding to the register value transmitted from the peripheral apparatus by the information processing apparatus.

Here, the control method may be achieved by further issuing the SCSI command from the information processing apparatus after a predetermined time when the register value is not a predetermined value.

Also, the control method may be achieved by further carrying out processing corresponding to the SCSI command contained in the received CBW by the peripheral apparatus when the SCSI command contained in the received CBW is not the predetermined SCSI command.

Also, the carrying out a process corresponding to the register value may be achieved by transmitting a data in the information processing apparatus to the peripheral apparatus.

BRIEF DESCRIPTION OF THE DRAWINGS

FIG. 7 is a diagram showing a CSW format;

DESCRIPTION OF THE PREFERRED EMBODIMENTS

Figure 1:
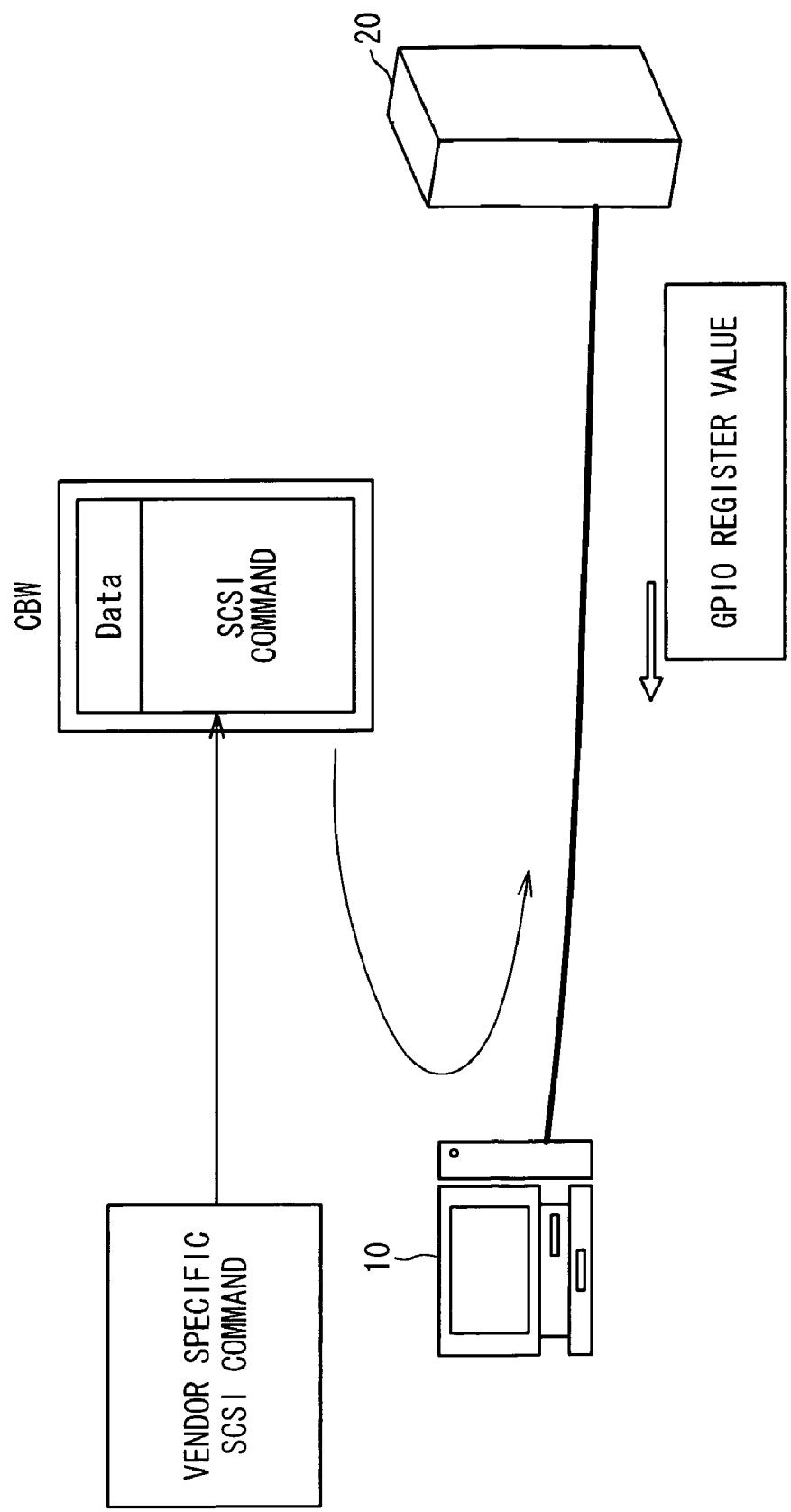
FIG. 1 is a schematic diagram showing a computer system of the present invention.

Hereinafter, a computer system of the present invention will be described in detail with reference to the attached drawings. The computer system of the present invention includes an information processing apparatus 10, and an external peripheral device 20, as shown in FIG. 1. The information processing apparatus 10 and the external peripheral device 20 communicate with each other by using USB (Universal Serial Bus). The USB is one of standards of data transmission between the information processing apparatus and the peripheral device. Here, an example will be described, in which the information processing apparatus 10 is a personal computer, and the external peripheral device 20 is a USB-IDE (Integrated Drive Electronics) bridge, to which an IDE device is connected. However, the present invention is not limited to the above-mentioned example.

The information processing apparatus 10 converts an SCSI command (vendor specific SCSI command) to read a register value of a general purpose input/output (GPIO) interface of the external peripheral device 20 into the form of CBW (Command Block Wrapper), and transmits the CBW to the external peripheral device 20 by using USB protocol. It should be noted that the general purpose input/output (GPIO) interface is a flexible parallel interface that allows various custom connections. Also, in the CBW, another data is added to the SCSI command.

The external peripheral device 20 transmits the register value of the general purpose input/output (GPIO) interface through the USB communication to the information processing apparatus 10 in response to the SCSI command. The information processing apparatus 10 executes a predetermined process corresponding to the register value received from the external peripheral device 20.

Figure 2:
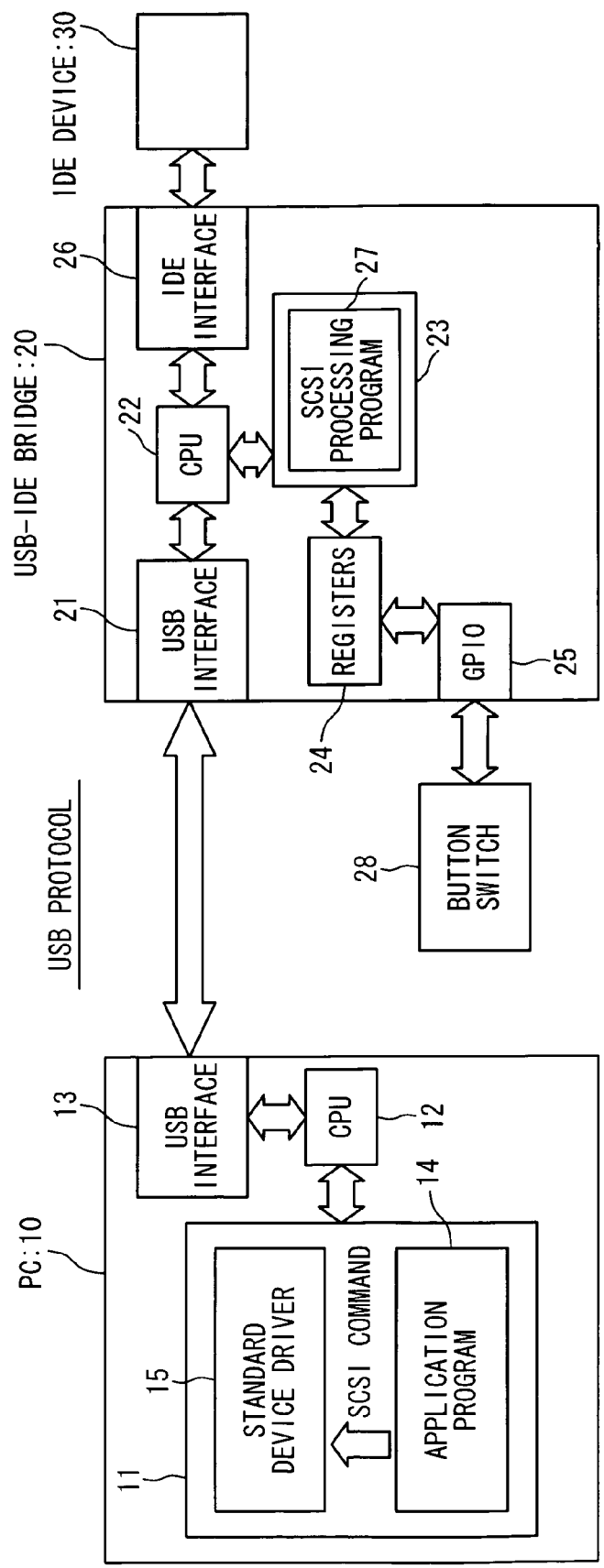
FIG. 2 is a block diagram showing a configuration of a computer system of the present invention.

FIG. 2 is a block diagram showing the configuration of the computer system according to an embodiment of the present invention. Referring to FIG. 2, the information processing apparatus 10 includes a memory 11, a CPU 12 and a USB interface 13. The external peripheral device 20 includes a USB interface 21, a CPU 22, a memory 23, registers 24, a general purpose input/output (GPIO) interface 25 and an IDE interface 26, to which the IDE device 30 is connected.

The memory 11 stores an application program 14 and a standard device driver 15. The standard device driver 15 is not dedicated to the peripheral device 20. The CPU 12 reads out the application program 14 and the standard device driver 15 from the memory 11 and executes them. The USB interface 13 communicates with another USB interface through a USB communication network. The USB communication network may be a wired network or a wireless network.

When the application program 14 is executed by the CPU 12, the CPU 12 issues an SCSI (Small Computer System Interface) vendor command (vendor specific SCSI command) as a SCSI command uniquely defined by a vendor. The CPU 12 may issue an SCSI command under a usual standard in addition to the SCSI vendor command based on the application program 14. Also, when the predetermined value is received from the external peripheral device 20 in response to the SCSI command, the CPU 12 carries out a process corresponding to the predetermined value based on the application program 14. A portion of the application program 14 to issue the SCSI command and a portion of the application program 14 to carry out the process corresponding to the predetermined value may be provided as different programs. The standard device driver 15 is installed on OS (Operating System). When the standard device driver 15 is executed by the CPU 12, the SCSI command is converted into the format of CBW, and the CBW is transmitted from the USB interface 13 to the USB interface 21.

When communication is carried out between the information processing apparatus 10 and the external peripheral device 20, the USB interface 13 uses the USB communication network to communicate with the USB interface 21. Here, the USB interface 13 transmits the CBW sent from the standard device driver 15 to the USB interface 21 in accordance with a USB communication rule. In the USB communication rule, a protocol based on a USB mass storage class is used. In the protocol based on the USB mass storage class, the SCSI command is incorporated into a USB packet in the form of the CBW. Also, an interruption transfer is not included.

The USB is an interface to connect the information processing apparatus 10 with various peripheral devices in a high speed serial communication. A large capacity storing device such as a hard disc or a CD drive can be connected as the peripheral device 20. These devices are referred to as the USB mass storage class in the USB rule. Also, requests peculiar to the USB mass storage class, the protocol, the CBW, and a CSW (Command Status Wrapper) are defined. It should be noted that the USB mass storage class is one of the USB classes, and is the class to treat the USB device classified as a large capacity storing device. Typically, this may be abbreviated as a USB storage class.

Figure 3:
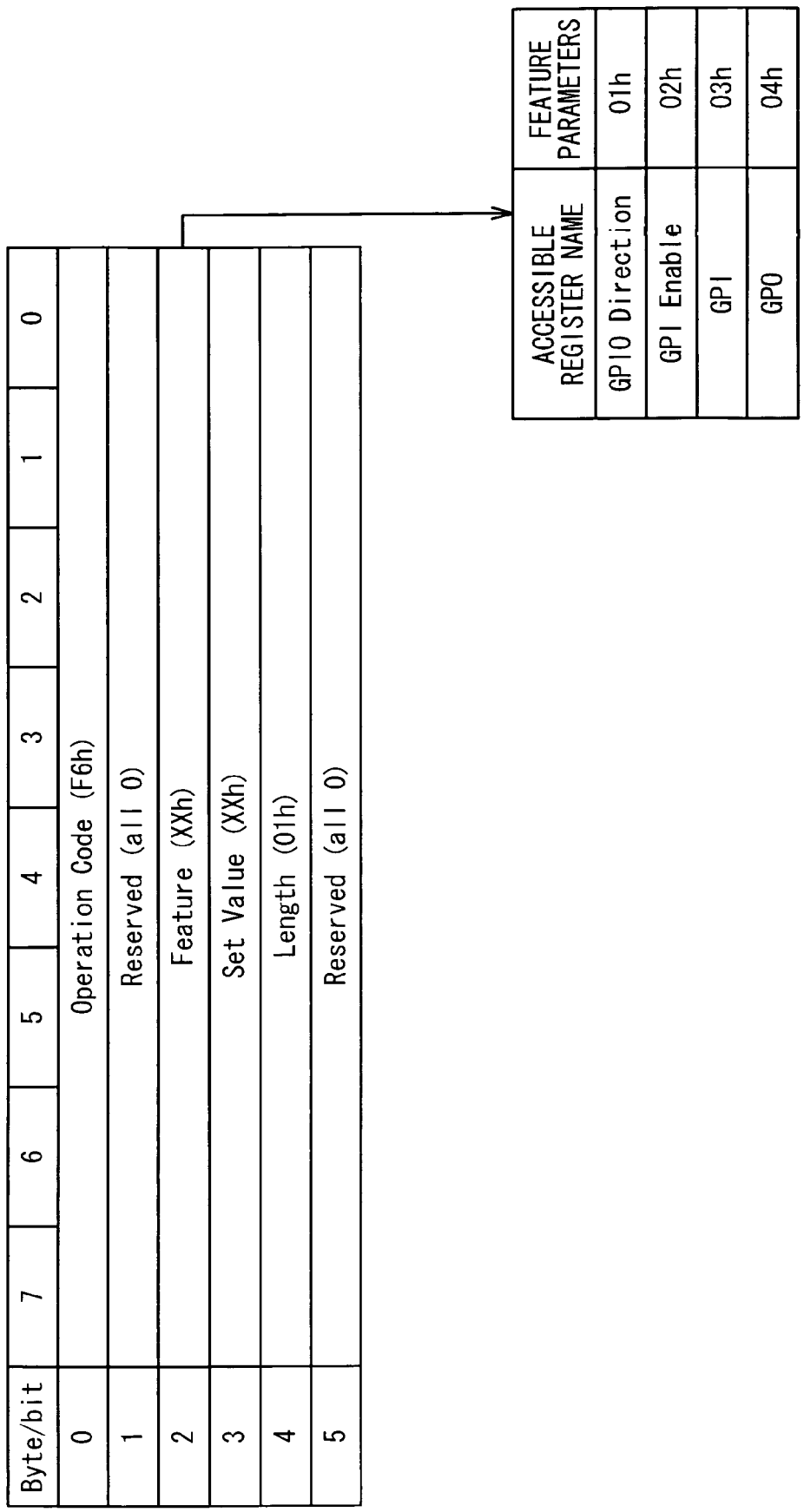
FIG. 3 is a diagram showing a format of an SCSI vendor command.

FIG. 3 shows one example of the format of the SCSI vendor command. Referring to FIG. 3, the SCSI vendor command has a 6-byte region from the 0-th byte to the fifth byte. The 0-th byte of the SCSI vendor command is for Operation Code, the first byte is Reserved, the second byte is for Feature, the third byte is for Set Value, the fourth byte is for Length, and the fifth byte is Reserved. Thus, the regions where the values are stored re defined. Which of the registers 24 should be accessed is specified based on a data in the second byte.

Figure 4:
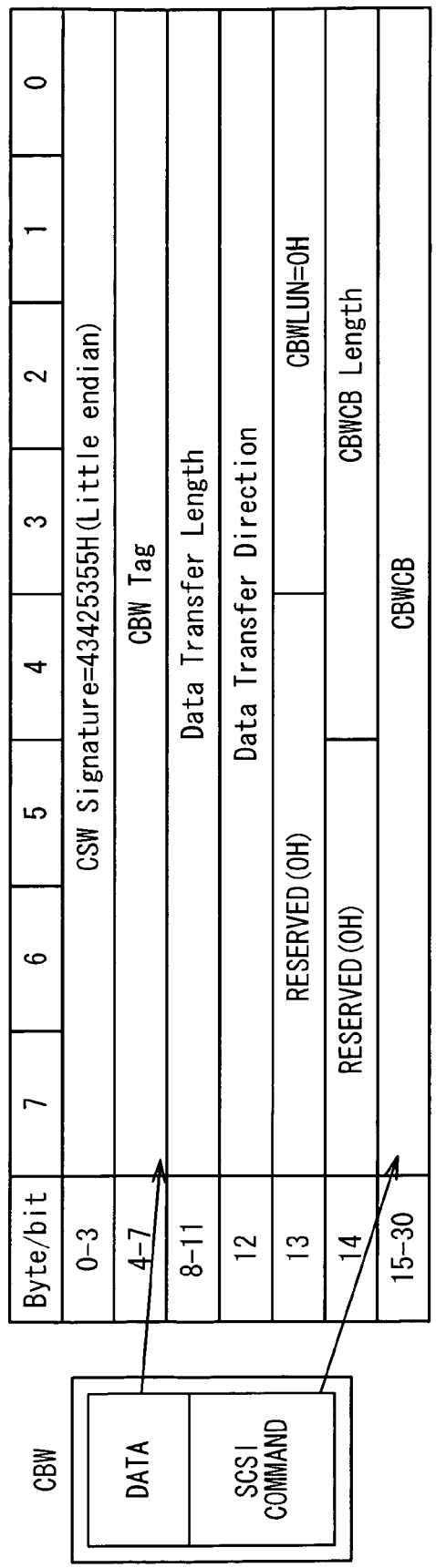
FIG. 4 is a diagram showing a format of CBW.

Next, with reference to FIGS. 4 and 5, the format of the CBW will be described below. The data region of the CBW is fixed to a 31-byte region of the 0-th type to the 30-th byte. Of the 31 bytes, a region of the 0-th to 14-th bytes is a region for another data. A region of the 0-th to third bytes is for CBW Signature, and any CBW is fixed to the same value. A region of the fourth to seventh bytes is for CBW Tag. A region of the eighth to eleventh bytes is for Data Transfer Length, and indicates the length of the data to be transferred. The twelfth byte is for Data Transfer Direction, and indicates a data transfer direction. The thirteenth byte includes CBWLUN (CBW logical device number), and the fourteenth byte includes CBWCB (CBW command block) Length indicating the length of the SCSI command. A region of the fifteenth to thirtieth bytes is for CBWCB, and the SCSI command is incorporated or inserted into it. It should be noted that the region of 16 bytes is set for the SCSI command in this example. However, all of the SCSI commands are not always 16 bytes.

Referring to FIG. 2, the memory 23 stores a SCSI processing program 27. The USB interface 21 communicates with the USB interface 13 of the information processing apparatus 10 by using the USB protocol, and receives the CBW from the USB interface 13. The CPU 22 receives the CBW from the USB interface 21, and executes the SCSI processing program 27 stored in the memory 23 based on the CBW. When the SCSI processing program 27 is executed by the CPU 22, the CPU 22 determines whether the SCSI command included in the CBW is a SCSI command under the normal rule or the SCSI vendor command uniquely defined by the vendor. When the SCSI command included in the CBW is determined to be the SCSI vendor command, the CPU 22 reads out a value stored in one of the registers 24 corresponding to the general purpose input/output (GPIO) interface 25 based on the SCSI processing program 27. A portion of SCSI processing program for determining whether or not the command contained the CBW is the SCSI vendor command and a portion of the SCSI processing program for reading the value of the register 24 may be provided as different programs.

The general purpose input/output (GPIO) interface 25 receives a signal from an input device such as a button switch 28, and stores a value corresponding to the received signal in a corresponding one of the registers 24. Here, the button switch 28 may be the external device that communicates with the external peripheral device 20. A communicating device for transmitting a value that can be written into the register 24 as a signal may be used instead of the button switch 28.

In the present invention, the SCSI vendor command is used to make it possible to access several registers 24 related to the general purpose input/output (GPIO) interface 25. Also, when the SCSI processing program 27 is the program for reading the register value stored in one of the registers 24 corresponding to the general purpose input/output terminal (GPIO) 25 in accordance with the SCSI vendor command. The access is periodically carried out to one register 24, and the value of the register 24 is read out.

The IDE interface 26 connects an IDE device 30 in accordance with a communication rule of IDE. The IDE is one of the methods of connecting the device and the storing device. As an example of the IDE device 30, there is a hard disc, a CD-ROM drive, an MO drive or a DVD drive. However, actually, this is not limited to the foregoing example. It should be noted that the IDE device 30 may be built in the external peripheral device 20. As an example that the external peripheral device 20 and the IDE device 30 are combined, there is an IDE interface HDD (Hard Disk Drive) with a USB-ID bridge. Also, a plurality of IDE devices 30 may be connected to the external peripheral device 20.

Figure 5:
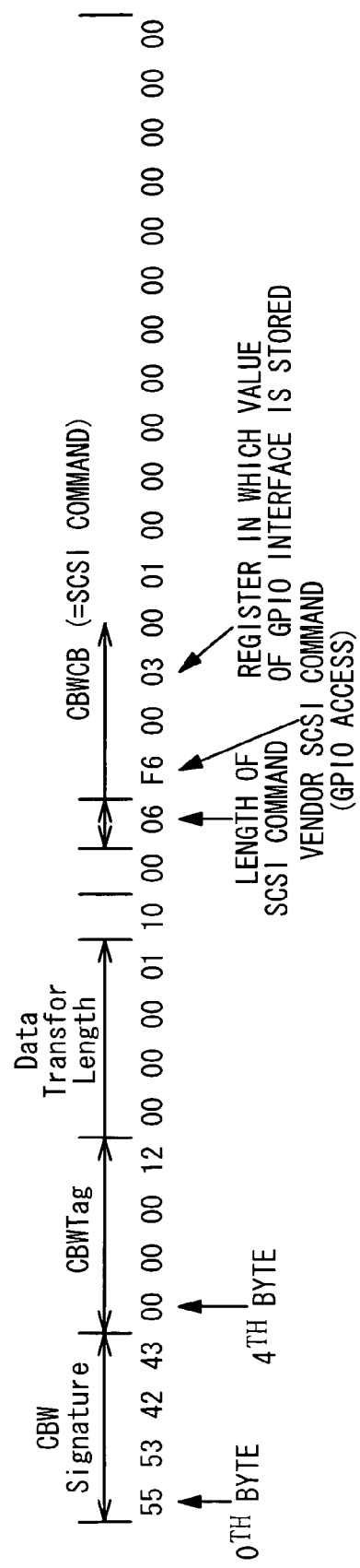
FIG. 5 is a diagram showing an example of an actual CBW.

As shown in FIG. 5, the SCSI processing program 27 is installed in the external peripheral device 20 to determine what type of the SCSI command is received, in accordance with [Operation Code]. For example, when [Operation Code] is F6, the external peripheral device 20 recognizes that the SCSI command is the SCSI vendor command that can access the general purpose input/output (GPIO) interface. Which of the registers for the GPIO is accessed is determined in accordance with the value of [Feature].

Figure 6:
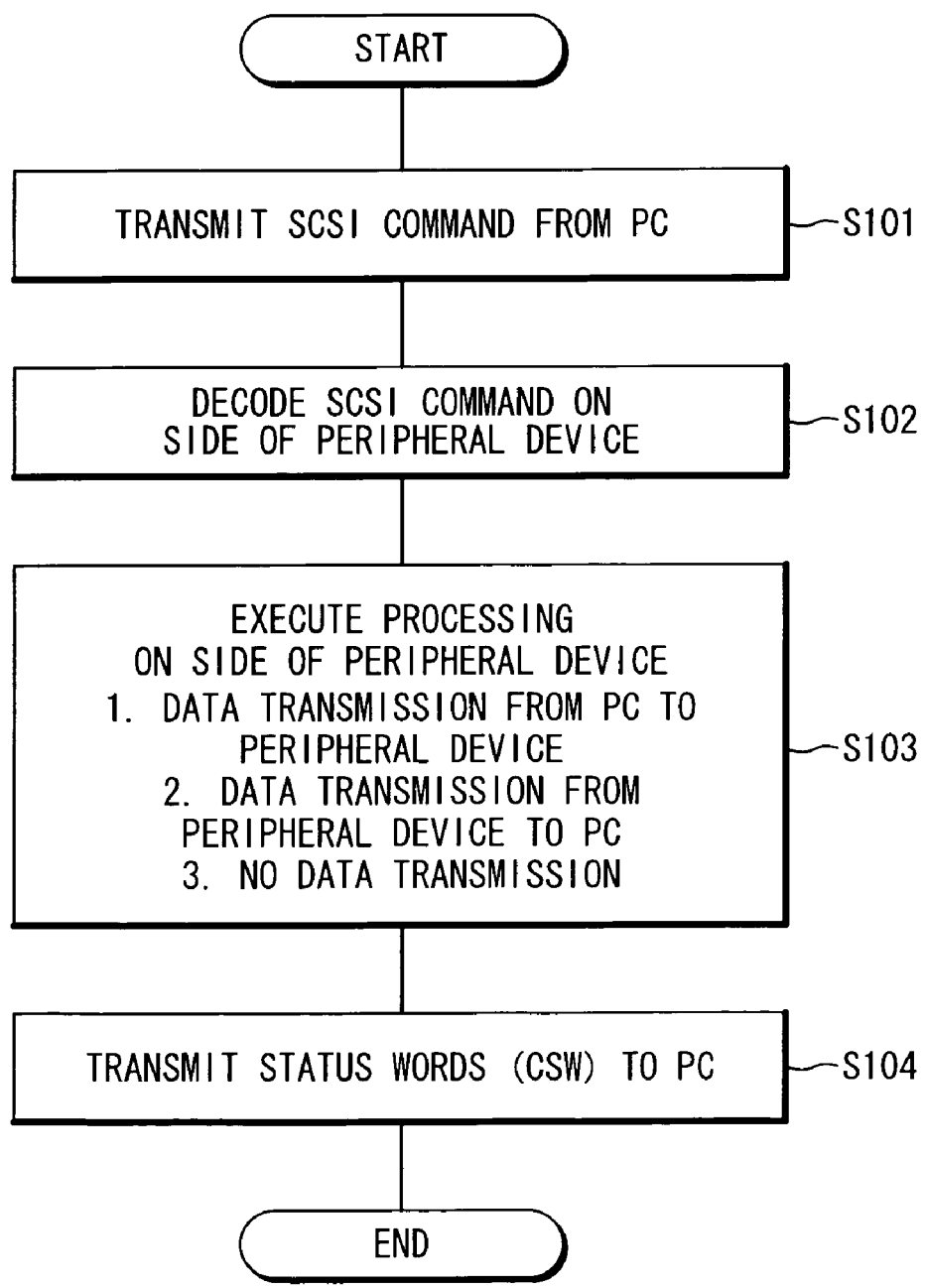
FIG. 6 is a flowchart showing an operation of the computer system of the present invention in a communication between an information processing apparatus and an external peripheral device.

FIG. 6 shows the operation of the communication between the information processing apparatus 10 and the external peripheral device 20. This operation is based on the protocol of the USB mass storage class. Here, the SCSI command based on the normal rule is used.

The information processing apparatus 10 transmits the CBW including the SCSI command to the external peripheral device 20 (Step S101). When the external peripheral device 20 receives the CBW, the external peripheral device 20 decodes the content of the SCSI command (Step S102). Depending on the content of the SCSI command, any of the following three processes is executed (Step S103): a first process that the information processing apparatus 10 transmits a data to the external peripheral device 20, a second process that the external peripheral device 20 transmits a data to the information processing apparatus 10, and a third process that a data is not transferred. For example, when a data should be written into the external peripheral device 20, the data is sent from the information processing apparatus 10 to the external peripheral device 20. In this example, in accordance with the SCSI vendor command, the external peripheral device 20 transmits the value of the register 24 to the information processing apparatus 10. Then, the external peripheral device 20 transmits the CSW (Command Status Wrapper) to the information processing apparatus 10 (Step S104). The CSW includes a status word to notify whether or not a sequence until the data is transferred is normally ended (there is a case that the data is not transferred), to the information processing apparatus 10.

The format of the CSW will be described below with reference to FIG. 7. The CSW is fixed to the entire data length of 13 bytes of a 0-th to a twelfth byte. The region of the 0-th to third bytes is CSW Signature, and any CSW is fixed to the same value. The region of the fourth to seventh bytes is CSW Tag. This is equal to the value of Tag of the CBW, and this and the CBW are paired together. The region of the eighth to eleventh bytes is CSW Data Residue, and the region stores the value of the difference in the length between the data having transmitted in a data transfer phase and the data indicated in the region of the eighth to eleventh bytes of the CBW. The twelfth byte is CSW Status, and this is the status information indicating whether or not it is normally ended. For example, it is represented as 10H that it is normally ended, and it is represented as 11H that the write is in the abnormal case.

Figure 8:
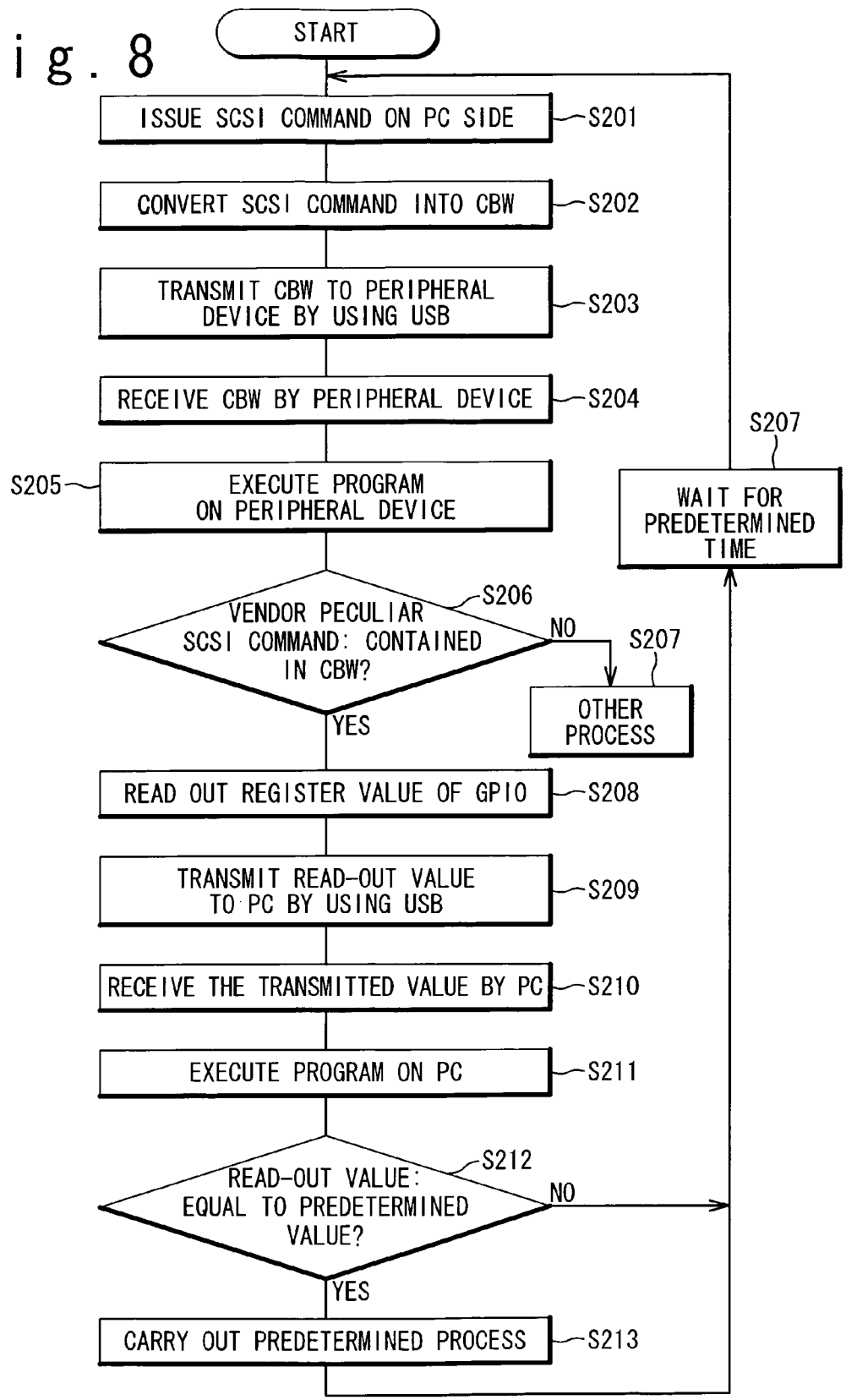
FIG. 8 is a flowchart showing a detailed operation of the computer system of the present invention.

FIG. 8 shows the operation in the entire computer system of the present invention. The CPU 12 reads the application program 14 stored in the memory 11 of the information processing apparatus 10 (personal computer) and executes it, and issues a SCSI vendor command to the standard device driver 15 to read the value of the register 24 (Step S201). The standard device driver 15 converts the SCSI vendor command or SCSI command into the form of the CBW (Command Block Wrapper) and sends to the USB interface 13 (Step S202). The USB interface 13 transmits the CBW to the USB interface 21 of the external peripheral device 20 in accordance with the communication rule (the protocol based on the USB mass storage class) (Step S203).

The USB interface 21 of the external peripheral device 20 receives the CBW and sends to the CPU 22 (Step S204). The CPU 22 reads the SCSI processing program 27 stored in the memory 23 and executes it (Step S205). The CPU 22 determines whether or not the SCSI command included in the CBW is the SCSI vendor command, based on the SCSI processing program 27 (Step S206). At this time, if the CBW includes any of the SCSI commands other than the SCSI vendor command, the CPU 22 carries out a predetermined process such as the process for reading or writing the data from or into the IDE device 30, in accordance with the content of the SCSI command. If the CBW includes the SCSI vendor command, the CPU 22 carries out the process for reading a value of one of the registers 24 for the general purpose input/output (GPIO) interface 25 based on the SCSI processing program 27, and sends the read register value to the USB interface 21 of the external peripheral device 20 (Step S208). The USB interface 21 of the external peripheral device 20 transmits the read register value to the USB interface 13 of the information processing apparatus 10 (Step S209).

The USB interface 13 of the information processing apparatus 10 receives the read register value and sends the read register value to the CPU 12 (Step S210). At this time, the CPU 12 may use the standard device driver 15. The CPU 12 reads and executes the application program 14 stored in the memory 11 (Step S211). The CPU 12 determines whether or not the register value is coincident with a predetermined value, based on the application program 14 (Step S212). If the register 24 value is not coincident with the predetermined value, the CPU 12 issues the SCSI vendor command to the standard device driver 15 again to read the register value based on the application program 14 after the predetermined time, and executes a predetermined process (Step S207).

On the other hand, if the register value is coincident with the predetermined value, the CPU 12 carries out a process corresponding to the predetermined value based on the application program 14 (Step S213). For example, when the register value is a certain value or more, the CPU 12 carries out the backup of the data or safely electrically disconnects peripheral device 20 from the information processing apparatus 10. At this time, the process to be carried out may be specified depending on the register value. Also, when the thresholds of an upper limit and a lower limit are set, and the register value is within a range between the thresholds, the predetermined process corresponding thereto may be executed. After the predetermined time from the process corresponding to the predetermined value, the CPU 12 issues the SCSI vendor command to the standard device driver 15 again to read the content of the register 24 based on the application program 14 (Step S207). Then, the application program 14 executes the predetermined process.

Figure 9:
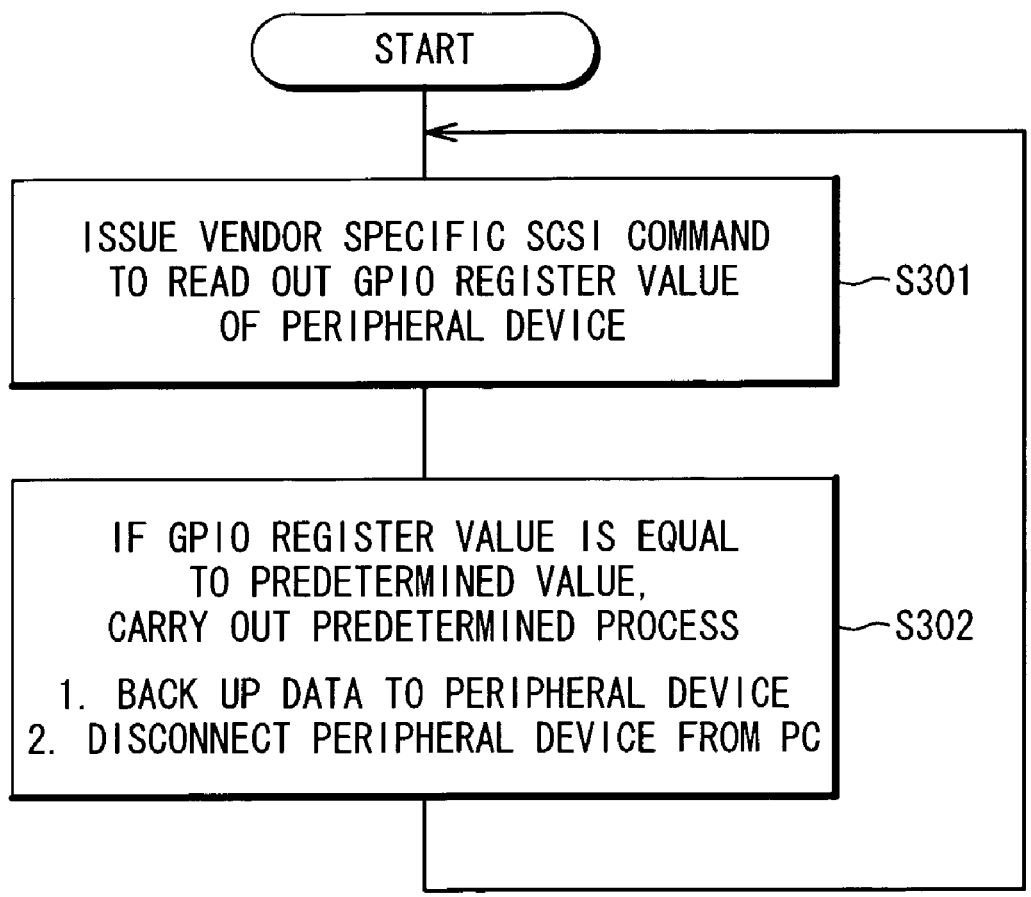
FIG. 9 is a flowchart showing an example of a process executed by an application program.

FIG. 9 shows the process executed by the CPU 12 based on the application program 14. The CPU 12 periodically issues the SCSI vendor command in accordance with the timer based on the application program 14, reads the register value through the standard device driver 15 as mentioned above, and monitors whether or not the push button (the button switch 28) is pushed down (Step S301). At this time, if the push button is pushed down, a predetermined value is stored in the register 24. When detecting that the register value becomes the predetermined value, the CPU 12 carries out the predetermined process based on the application program 14. Here, in the predetermined process, the backup on the data is carried out from the storing device such as HDD in the information processing apparatus 10 to the external storing device (IDE device 30) as the backup destination (Step S302). The external storing device is connected to the IDE device interface (IDE interface 26) of the USB-IDE bridge (external peripheral device 20). After that, the operational flow again returns to the process at the step S301.

It should be noted that the safe disconnection of the device is carried out, like the backup of the data. That is, when the button is pushed down, the register value is set to the predetermined value. At this time, the CPU 12 carries out the predetermined process based on the application program 14 to safely disconnect a USB device composed of the IDE device interface 26 and the IDE device 30. When the processes other than the backup of the data and the disconnection of the device are executed, they are similarly executed.

As mentioned above, in the computer system of the present invention, the personal computer can access the register for the general purpose input/output (GPIO) interface by using the SCSI vendor command, when a bridge chip between the IDE device and a communicating unit using the SCSI command in a higher layer protocol has a general purpose input/output interface. Also, the personal computer can read the register value for the GPIO in a constant interval in accordance with the application program 14 by using the SCSI vendor command. Thus, the data backup can be carried out from the built-in HDD to the external storing device on the basis of the register value, or the external storing device can be safely disconnected from the personal computer.

In the present invention, the standard device driver preliminarily installed is used to read the register value of the register for the general purpose input/output (GPIO) interface. Thus, a dedicated device driver is not necessitated and the number of the developing steps of the chip and the program can be reduced, resulting in cost-down of the development.

For the end user, it is easy to introduce the application program because a work for installing the device driver is not required. Moreover, the process for disconnecting the external device can be easily carried out through an operation of a button, and a complex process in the conventional method.

Also, the present invention does not require the dedicated device driver. Thus, the present invention deals with a communication method of the USB mass storage class. Therefore, an electronic device can be used as the external peripheral device 20, when the electronic device can be controlled in accordance with the SCSI vendor command included in the CBW. Also, when the electronic device is used, a new device driver for the electronic device is not required to be newly installed.

What is claimed is:

1. A method performed by a device, the method comprising:
   receiving, through a general purpose input/output (GPIO) interface, an input that sets a value in a register in the device to specify a process to be carried out by an information processing apparatus;
   receiving, by the device, through a universal serial bus (USB) interface after said input has been received, a command block wrapper (CBW) that includes a small computer system interface (SCSI) command, the CBW being issued based on a Bulk-Only-Transport (BOT) protocol of a mass storage class, and said CBW including a particular vendor-specific SCSI command being periodically issued;
   determining, by the device, whether the SCSI command is (i) a normal type of SCSI command to read data from or write data to a specific device or (ii) the particular vendor-specific SCSI command to read the value from the register, based at least partially on a code included in the SCSI command; and
   transmitting, by the device, information about the value in the register through the USB interface to the information processing apparatus in a case where it is determined that the SCSI command is the particular vendor-specific SCSI command.

2. The method of claim 1,
   wherein the input comprises a signal from a button switch.

3. The method of claim 1,
   wherein the input is independent of an execution of the SCSI command.

4. The method of claim 1,
   wherein the process to be carried out by the information processing apparatus is at least one of (i) performing a backup of data stored in a memory of the information processing apparatus, or (ii) electrically disconnecting the device from the information processing apparatus, and
   wherein, based on whether or not the value in the register is within a certain range, either the backup of data stored in the memory of the information processing device is performed or the device is disconnected from the information processing apparatus.

5. The method of claim 1, wherein the specific device is a storage device.

6. The method of claim 5, wherein the storage device comprises an integrated drive electronics (IDE) device, and said performing processing comprising:
   performing processing to read data from or write data to the IDE device through an IDE interface that is different from the GPIO interface in accordance with the SCSI command in the case where it is determined that the SCSI command is the normal type of SCSI command to read data from or write data to the specific device.

7. A device, comprising:
   a general purpose input/output (GPIO) interface for receiving an input that sets a value in a register of the device to specify a process to be carried out by an information processing apparatus;
   a universal serial bus (USB) interface for receiving a command block wrapper (CBW) that includes a small computer system interface (SCSI) command; and
   a processing unit configured to receive a command block wrapper (CBW) that includes a small computer system interface (SCSI) command, and that is issued based on a Bulk-Only-Transport (BOT) protocol of a mass storage class, and said CBW including a particular vendor-specific SCSI command being periodically issued;
   the processing unit configured to determine whether the SCSI command is (i) a normal type of SCSI command to read data from or write data to a specific device or (ii) the particular vendor-specific SCSI command to read the value from the register, based at least partially on a code included in the SCSI command; and
   the processing unit configured to transmit information about the value in the register through the USB interface to the information processing apparatus in a case where the value is set by the input and then the particular vendor-specific SCSI command is received.

8. The device of claim 7,
   wherein the input comprises a signal that indicates a state of a button switch.

9. The device of claim 7,
   wherein the input is independent of an execution of the SCSI command.

10. The device of claim 7,
    wherein the process to be carried out by the information processing apparatus is at least one of (i) performing a backup of data stored in a memory of the information processing apparatus, or (ii) electrically disconnecting the device from the information processing apparatus, and
    wherein, based on whether or not the value in the register is within a certain range, either the backup of data stored in the memory of the information processing device is performed or the device is disconnected from the information processing apparatus.

11. The device of claim 7, wherein the specific device is a storage device.

12. The device according to claim 7, further comprising:
    the processing unit configured to perform processing to read data from or write data to the specific device in accordance with the SCSI command in a case where it is determined that the SCSI command is the normal type of SCSI command to read data from or write data to the specific device.

13. The device of claim 11, further comprising:
    an integrated drive electronics (IDE) interface that is different from the GPIO interface, said processing unit configured to read data from or write data to the storage device through the IDE interface in accordance with the SCSI command in the case where it is determined that the SCSI command is the normal type of SCSI command to read data from or write data to the storage device.

14. A method performed by an information processing apparatus, the method comprising:
    transmitting, through a universal serial bus (USB) interface to a device based on a Bulk-Only-Transport (BOT) protocol of a mass storage class, a command block wrapper (CBW) comprising a small computer system interface (SCSI) command that includes a code to indicate whether the SCSI command is (i) a normal type of SCSI command to read data from or write data to a storage device or (ii) a vendor-specific SCSI command to read a value from a register of the device, said code set in the SCSI command to indicate that the SCSI command is the vendor-specific SCSI command, and said CBW including the particular vendor-specific SCSI command being periodically transmitted;

receiving, through the USB interface from the device in response to the SCSI command, information about a value that has been set in the register by an input to a general purpose input/output (GPIO) interface of the device; and carrying out a process specified by the value.

15. The method of claim 14,
said SCSI command further including a feature value that selects a register from among a plurality of registers in the device from which the value is to be read.

16. The method of claim 14,
wherein the value is indicative of output provided from a button switch.

17. The method of claim 14,
wherein the process is at least one of (i) performing a backup of data stored in a memory of the information processing apparatus, or (ii) electrically disconnecting the device from the information processing apparatus, and wherein, based on whether or not the value in the register is within a certain range, either the backup of data stored in the memory of the information processing device is performed or the device is disconnected from the information processing apparatus.

18. The method of claim 14, further comprising:
transmitting, through the USB interface to the device, a command to have the device store data in an integrated drive electronics (IDE) device through an IDE interface of the device that is different from the GPIO interface.

19. An information processing apparatus, comprising:
a processing unit; and
a universal serial bus (USB) interface;
said processing unit configured to transmit, through the USB interface to a device based on a Bulk-Only-Transport (BOT) protocol of a mass storage class, a command block wrapper (CBW) comprising a small computer system interface (SCSI) command that includes a code to indicate whether the SCSI command is (i) a normal type of SCSI command to read data from or write data to a storage device or (ii) a vendor-specific SCSI command to read a value from a register of the device, said code set in the SCSI command to indicate that the SCSI command is the vendor-specific SCSI command being periodically transmitted;

said processing unit configured to receive, through the USB interface from the device in response to the SCSI command if the SCSI command is the vendor-specific SCSI command, information about a value in the register that has been set by an input to a general purpose input/output (GPIO) interface of the device; and said processing unit configured to carry out a process specified by the value.

20. The information processing apparatus of claim 19,
said SCSI command further including a feature value that selects a register from among a plurality of registers in the device from which the value is to be read.

21. The information processing apparatus of claim 19,
wherein the value is indicative of output provided from a button switch.

22. The information processing apparatus of claim 19,
wherein the process is at least one of (i) performing a backup of data stored in a memory of the information processing apparatus, or (ii) electrically disconnecting the device from the information processing apparatus, and wherein, based on whether or not the value in the register is within a certain range, either the backup of data stored in the memory of the information processing device is performed or the device is disconnected from the information processing apparatus.

23. The information processing apparatus of claim 19,
said processing unit configured to transmit, through the USB interface to the device, a command to have the device store data in an integrated drive electronics (IDE) device through an IDE interface of the device that is different from the GPIO interface.

24. The method of claim 14, further comprising:
inserting the SCSI command into the CBW using a standard device driver for USB mass storage class devices.

25. A computer system comprising an information processing apparatus and a peripheral apparatus,
wherein said information processing apparatus comprises:
a processing section configured to execute an application program to issue a particular vendor-specific SCSI (Small Computer System Interface) command or a normal type SCSI command, wherein said information processing apparatus is configured to execute a device driver to incorporate the issued particular vendor-specific SCSI command or the issued normal type SCSI command into a CBW (Command Block Wrapper); and a USB (Universal Serial Bus) interface configured to transmit said CBW based on a Bulk-Only-Transport (BOT) protocol of a mass storage class, said CBW including the particular vendor-specific SCSI command being periodically transmitted, and wherein said peripheral apparatus comprises:
a GPIO (general purpose input/output) interface; and a register configured to hold a register value indicating a state of said GPIO interface, wherein said peripheral apparatus is configured to receive said CBW from said information processing apparatus, and execute a SCSI processing program based on the received CBW to transmit the register value to said information processing apparatus, when said particular vendor-specific SCSI command is incorporated in the received CBW, and wherein said information processing apparatus is configured to execute said application program to execute a first process corresponding to the register value when the register value is received.

26. The computer system according to claim 25, wherein said peripheral apparatus executes a second process corresponding to said normal type SCSI command when said normal type SCSI command has been incorporated in the CBW.

27. The computer system according to claim 25, further comprising:
an input device, wherein when said input device is operated, the register value is set in said register.

28. The computer system according to claim 25, wherein said information processing apparatus executes said first process to transmit data to said peripheral apparatus when the register value is a predetermined value, and said peripheral apparatus backs up the data.

29. The computer system according to claim 25, wherein said information processing apparatus carries out a third process to electrically disconnect said peripheral apparatus from said information processing apparatus when said register value is a predetermined value.

30. The computer system according to claim 25, wherein said information processing apparatus issues said SCSI command after a predetermined time when the register value is not said predetermined value.

31. An operation method of a computer system comprising an information processing apparatus and peripheral apparatus, said operation method comprising:

executing an application program by said information processing apparatus to issue a particular vendor-specific SCSI (Small Computer System Interface) command or a normal type SCSI command;

executing a device driver by said information processing apparatus to incorporate said issued particular vendor-specific SCSI command or said issued normal type SCSI command into a CBW (Command Block Wrapper);

transmitting said CBW from a USB (Universal Serial Bus) interface of said information processing apparatus to said peripheral apparatus based on a Bulk-Only-Transport (BOT) protocol of a mass storage class, said CBW including the particular vendor-specific SCSI command being periodically transmitted;

receiving said CBW from said information processing apparatus by said peripheral apparatus to execute a SCSI processing program;

transmitting a register value of a register indicating a state of a GPIO (general purpose input/output) interface to said information processing apparatus by said peripheral apparatus, when said particular vendor-specific SCSI command has been incorporated in the received CBW; and executing said application program to execute a first process corresponding to the register value by said information processing apparatus when the register value is received.

32. The operation method according to claim 31, further comprising:

executing a second process corresponding to said SCSI command by said peripheral apparatus when said SCSI command is incorporated in the CBW.

33. The operation method according to claim 31, further comprising:

setting the register value in said register in response to an operation of an input section.

34. The operation method according to claim 31, wherein said executing said application program to execute a first process comprises:

executing said first process to transmit data from said information processing apparatus to said peripheral apparatus when the register value is a predetermined value; and backing up the data by said peripheral apparatus.

35. The operation method according to claim 31, further comprising:

executing a third process to electrically disconnect said peripheral apparatus from said information processing apparatus when said register value is a predetermined value.

36. The operation method according to claim 31, further comprising:

issuing said SCSI command by said information processing apparatus after a predetermined time when the register value is received.

37. The method of claim 1, further comprising:

performing, by the device, processing to read data from or write data to the specific device in accordance with the SCSI command in a case where it is determined that the SCSI command is the normal type of SCSI command to read data from or write data to the specific device.

\* \* \* \* \*